R. G. HOUSDORFER.
DIE FOR FORMING AXLES.
APPLICATION FILED DEC. 20, 1911.
1,050,460.
Patented Jan. 14, 1913.
2 SHEETS—SHEET 1.
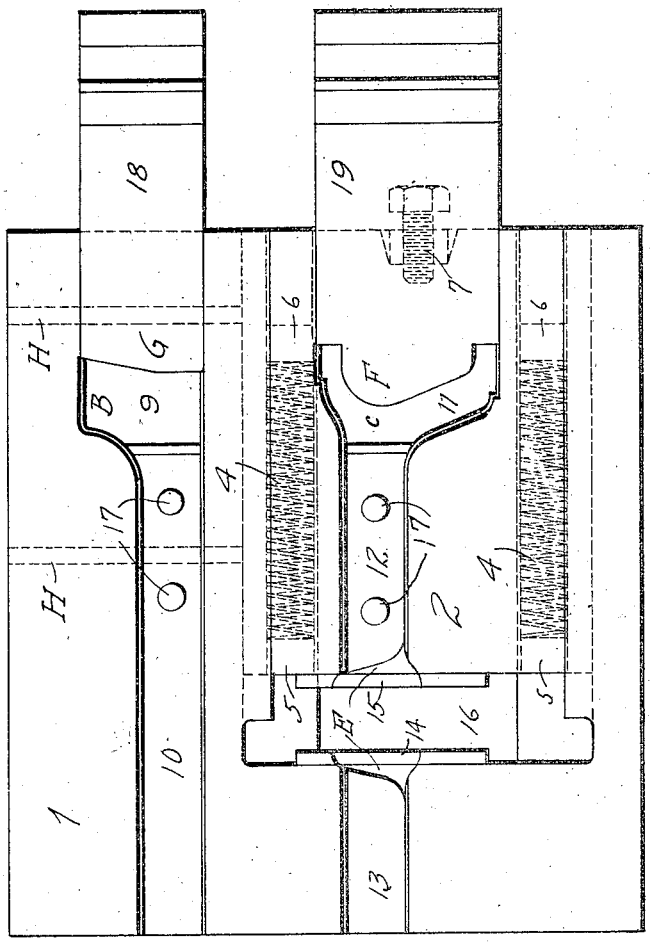
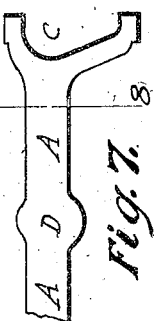
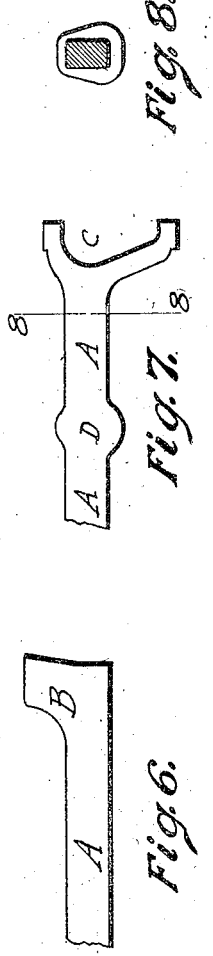
WITNESSES.
Paul A. R. Kroesing.
Lotta Lee Bray.
INVENTOR
Reinhold G. Housdorfer
By Halgemond A. Parker
Attorney R. G. HOUSDORFER.
DIE FOR FORMING AXLES.
APPLICATION FILED DEC. 20, 1911.
1,050,460.
Patented Jan. 14, 1913.
2 SHEETS—SHEET 2.
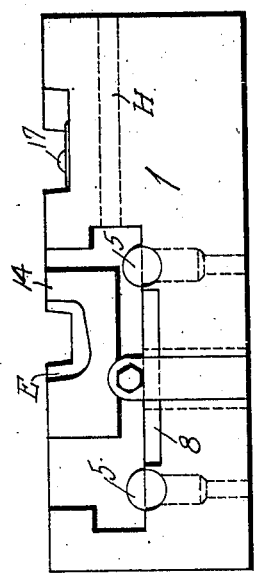
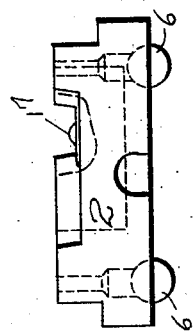
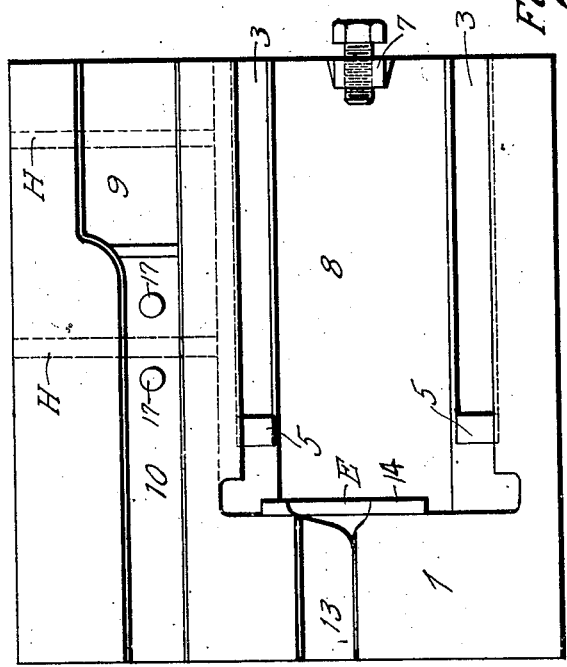
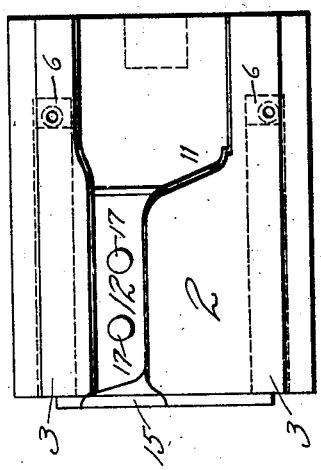
WITNESSES.
Paul G. R. Kroesing
Lotta Lee Bray
INVENTOR
Reinhold G. Housdorfer
by Raymond A. Parker
Attorney

UNITED STATES PATENT OFFICE.

REINHOLD G. HOUSDORFER, OF TOLEDO, OHIO.

DIE FOR FORMING AXLES.

1,050,460.  Specification of Letters Patent.  Patented Jan. 14, 1913.

Application filed December 20, 1911. Serial No. 667,006.

*To all whom it may concern:*

Be it known that I, REINHOLD G. HOUSDORFER, a citizen of the United States, residing at Toledo, county of Lucas, State of Ohio, have invented a certain new and useful Improvement in Dies for Forming Axles, and declare the following to be a full, clear, and exact description of the same, such as will enable others skilled in the art to which it pertains to make and use the same, reference being had to the accompanying drawings, which form a part of this specification.

My invention relates to an apparatus for a preliminary forming of the material for the front axles of automobiles, and an object of my improvements is to provide for forming the ends in improved dies. I accomplish this object by the apparatus illustrated in the accompanying drawings, in which, Figure 1, is one half of a die in which the axles are formed by punches 18 and 19 as shown. Fig. 2, is a view similar to Fig. 1, the punches and movable die being omitted. Fig. 3, is an end view looking from the right of Fig. 2. Fig. 4, is a plan view of one half of the movable die. Fig. 5, is an elevation of the part shown in Fig. 4, looking from the right of said figure. Fig. 6, shows a part of the bar from which the axle is to be formed, the end being partly shaped as by the first operation. Fig. 7, is a view of the same part after being finished in the second die. Fig. 8, is a section on the line 8—8 Fig. 7 looking from the right of the section line.

The end of the bar A is first formed as shown at B in Fig. 6 in one die, and is then in a second die and, preferably, after reheating formed into the completed shape shown in Fig. 7. During the latter operation the metal is thickened and formed into the wedge shape shown at D Fig. 7, as a preliminary operation to forming the pad. In Figs. 1 to 5 inclusive, only half of the part represented is shown (with the exception of the punches 18 and 19) the other part being precisely the same, or complementary.

1, is the main body of the die, this is formed with a groove 10 adapted to receive the bar A from which the axle is to be formed. The groove 10 has an enlargement 9 extending laterally upon one side and opening at the right hand end surface of the main body 1.

The main body 1 is provided with a groove 13 into which the bar A may pass, said groove being extended laterally in both directions to form a cavity or socket for receiving the sliding die 2. Said cavity or socket opens in the right hand surface of the main body 1 of the die. There is a liner 8 placed along the bottom of said cavity upon which liner the die 2 moves. The sides of said cavity are undercut to form tracks or guides for the movable die, which is formed to said undercut portion at its edges.

7, is a lug extending from the main body 1 of the die and forming an adjustable stop to limit the motion of the movable die toward the right, as shown in the figures.

12, is a groove in the surface of the movable die 2 and adapted to come in line with and form an extension of the groove 13 in the main body 1 of the die. The groove 12 is enlarged toward its right hand end and opens through the right hand vertical surface of the movable die 2. The inner bounding faces of the enlarged portion of the groove 12 are shaped to the contour of the inner surface of the fork C of the axle.

17, are pins or protuberances rising slightly from the bounding surface of the groove 12.

The groove 12 at its left hand end is formed to the wedge shape half of the part D, and the groove 13 at its right hand end is shaped to form the other half, as indicated by the reference letter E.

15, indicates wearing plates.

19, is a punch having its left hand end shaped to form the right hand surface of the fork C of the axle.

5, 5 are stop pins removably placed in cavities for that purpose in the body 1 of the die to form rests for the left hand ends of the spring 4. 6, 6 are similar stop pins adapted to be inserted in cavities in the inner surface of the sliding die 2.

4, 4 are compression springs, which act to force the sliding die 2 toward the right hand end of its stroke, as shown in Fig. 1, thus leaving a space 16 between the left hand surface of the movable die 2 and the inner bounding surface of the enlargement of the groove 13.

Oil is supplied to the wearing surface of the die and its socket through passages H, H.

The following is the mode of forming the axle and the operation of the above described apparatus. The bar A from which the axle is to be formed is first placed in the groove 10. Enough of the metal of the bar A comes into the enlargement 9 to form the part B (Fig. 6) on the end of said bar, of course there is the usual stop, which it is not necessary to show to properly position the bar A in a longitudinal direction. The punch 8 which is chamfered off in the direction to which it is desired to force the metal in the shape shown at G, Fig. 1, is then forced into the enlargement 9 forming the part B. The bar A having its end thus formed is then removed, reheated and placed in the grooves 12 and 13, the two parts of the dies being forced together press the protuberances 17 into the metal of the bar to secure it longitudinally in the groove 12 of the movable die 2. The punch 19 is then forced into the enlargement of the groove 12, its inner end shaping the right hand surface of the fork C, as shown in Fig. 1, and pressing the movable die 2 toward the left, thus expanding the metal of the bar A, which is between the ends of the grooves 13 and 12, into the cavities E and shaping the pad D. The end of the axle is thus formed. The bar A shaped toward each end, as above described, is then ready to be made into the completed product. The dies may be kept cool with water and the lubrication maintained.

What I claim is:—

A die body having a groove at one end adapted to receive a bar, a die block longitudinally movable in a concavity in said die body and in line with the groove therein, said die block having a continuation of said groove with an enlargement in its end opposite the fixed groove in said die body and adapted to register with said groove, said die block having an enlargement of the groove at its opposite end, an upsetting punch adapted to enter said enlargement and form the end of a bar located in said grooves and also causing said die block to move and upset said bar in the enlargement at its point of junction with the die body, substantially as described.

In testimony whereof, I sign this specification in the presence of two witnesses.

REINHOLD G. HOUSDORFER.

Witnesses:
PAUL A. R. KROESING,
ELLIOTT J. STODDARD.